United States Patent
Barlas et al.

(10) Patent No.: US 6,641,156 B1
(45) Date of Patent: Nov. 4, 2003

(54) DEVICE FOR CONNECTING SUSPENSION SYSTEM COMPONENTS FOR AXLE HOUSING

(75) Inventors: Serge A. Barlas, St. Charles, IL (US); Michael Brannigan, Chicago, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/535,668

(22) Filed: Feb. 22, 2000

(51) Int. Cl.⁷ .............................................. B60G 11/12
(52) U.S. Cl. .................... 280/124.175; 280/124.116; 228/178
(58) Field of Search ................. 280/124.1, 124.175, 280/124.174, 124.116, 127, 130, 680; 267/52, 53, 51; 180/414, 424; 219/137 R, 125.1; 228/178

(56) References Cited

U.S. PATENT DOCUMENTS

| | | | | |
|---|---|---|---|---|
| 3,386,724 A | * | 6/1968 | Tantlinger et al. | 267/52 |
| 3,437,333 A | * | 4/1969 | Koch et al. | 267/52 |
| 3,630,541 A | * | 12/1971 | Carlson | 267/52 |
| 3,891,197 A | * | 6/1975 | Poulos | 267/52 |
| 3,913,937 A | * | 10/1975 | Longworth et al. | 280/680 |
| 4,227,716 A | | 10/1980 | Nordstrom | |
| 4,801,129 A | * | 1/1989 | Wells | 267/52 |
| 5,046,756 A | * | 9/1991 | Hertrick | 267/52 |
| 5,320,192 A | * | 6/1994 | Hayashida et al. | 180/414 |
| 5,346,247 A | * | 9/1994 | Snyder | 280/124.116 |
| 5,476,251 A | * | 12/1995 | Moses et al. | 267/52 |
| 5,921,570 A | * | 7/1999 | Lie | 280/124.175 |
| 5,950,971 A | * | 9/1999 | Koumbis et al. | 280/124.1 |
| 6,015,158 A | * | 1/2000 | Overby | 280/124.175 |
| 6,032,967 A | * | 3/2000 | Ogoniek | 280/124.175 |
| 6,082,750 A | * | 7/2000 | Merkler et al. | 280/124.175 |
| 6,129,369 A | * | 10/2000 | Dudding | 280/124.175 |

* cited by examiner

Primary Examiner—Brian L. Johnson
Assistant Examiner—Hau Phan
(74) Attorney, Agent, or Firm—Cook, Alex, McFarron, Manzo, Cummings & Mehler, Ltd.

(57) ABSTRACT

An axle connection device designed to be welded to an axle housing to permit a vehicle suspension system to be connected to the axle housing is disclosed. The device includes a generally flat baseplate having curvilinear ends separated by a relatively long and narrow waist. Each end includes a curvilinear side rim and two rounded corners from which longitudinally extending edges positioned on opposite sides of the device smoothly taper towards the waist. The device also includes a generally horizontally projecting plane having a waist aligned with the waist of the baseplate to divide the plane into two distinct portions. The plane also has two supporting sidewalls. Both sidewalls extend from just inside the rounded corners of a respective end of the baseplate and taper towards associated corners of the horizontally projecting plane. Each portion of the plane includes a generally rounded boss extending from the plane. A slot extending from the intersection of the baseplate and the plane is incorporated in each boss to allow a connection bolt to pass through the device. The construction of the device permits it to accommodate varying pinion angles and axle housing mismatch. The preferred method of welding the axle connection device to the axle housing is also disclosed.

28 Claims, 4 Drawing Sheets

DEVICE FOR CONNECTING SUSPENSION SYSTEM COMPONENTS FOR AXLE HOUSING

BACKGROUND OF THE INVENTION

The present invention relates generally to devices that permit a suspension system to connect to an axle housing, and more particularly, to devices welded to the axle housing that permit active components of a suspension system to be connected to the axle housing. The present invention is further directed to a method of welding such devices to the axle housing.

A basic object of any suspension system in a vehicle is to suspend the vehicle body above the vehicle wheels. To achieve this end, suspension systems are typically connected between the axle, or its housing, and the vehicle frame. Suspension systems typically include active components, such as springs and the like, to keep the sprung mass (vehicle body) suspended above the unsprung mass (vehicle wheels). A suspension system preferably permits a relatively smooth, yet stable, ride during acceleration, deceleration and cornering of the vehicle, and during jounce and rebound of the axle when the vehicle is driven over bumpy surfaces and the like.

In vehicles, one or more devices are sometimes welded to the axle housing to provide means for connecting the vehicle suspension to the axle housing. An example of such an arrangement is disclosed in U.S. Pat. No. 4,227,716, issued to Nordstrom, the disclosure of which is hereby incorporated herein by reference. As disclosed therein, and as shown in FIGS. 1–5 of the accompanying drawings, an axle housing 20 having a differential gear housing 22 at a central portion thereof is connected between vehicle wheels 24 positioned on opposite sides of a vehicle. Axle connection devices 26, which shall later be described in further detail, are welded to the front and rear faces of axle housing 20 in close proximity to each vehicle wheel 24. These connection devices 26 provide means for connecting a vehicle suspension 30 to the axle housing 20.

The vehicle includes a frame 32 extending longitudinally down each side of the vehicle. The vehicle suspension 30 is connected between the vehicle frame 32 and the axle housing 20 to suspend the vehicle body (not shown) above the vehicle wheels 24. The vehicle suspension 30 shown and described in U.S. Pat. No. 4,227,716, and in FIGS. 1–2 of the accompanying drawings, is generally known in the art as a Hotchkiss-type suspension. As shown, the suspension includes a main multi-leaf leaf spring pack 34 and an auxiliary multi-leaf leaf spring pack 36. The leaf springs that form the main leaf spring pack 34 are bundled together by a series of ties 38. The proximal end of the main leaf spring pack 34 is pivotally connected to a hanger 40, which in turn is fixedly mounted to the vehicle frame 32. The distal end of the main leaf spring pack 34 is connected to another hanger 42, which is also fixedly mounted to the vehicle frame 32. The distal end, however, is connected to hanger 42 through a shackle 44 that permits the distal end to move during deflection of the main leaf spring pack. The central portion of the main leaf spring pack 34 is seated on axle seating 46.

Figure 1:
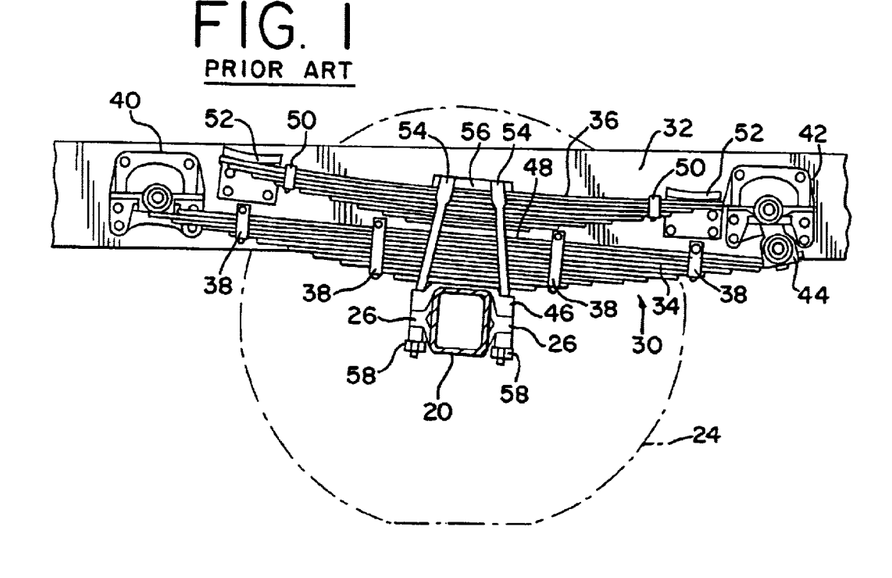
FIG. 1 is a side view of a leaf spring attachment arrangement of the type utilizing axle connection devices that are conventionally used in prior art suspension systems.
Figure 2:
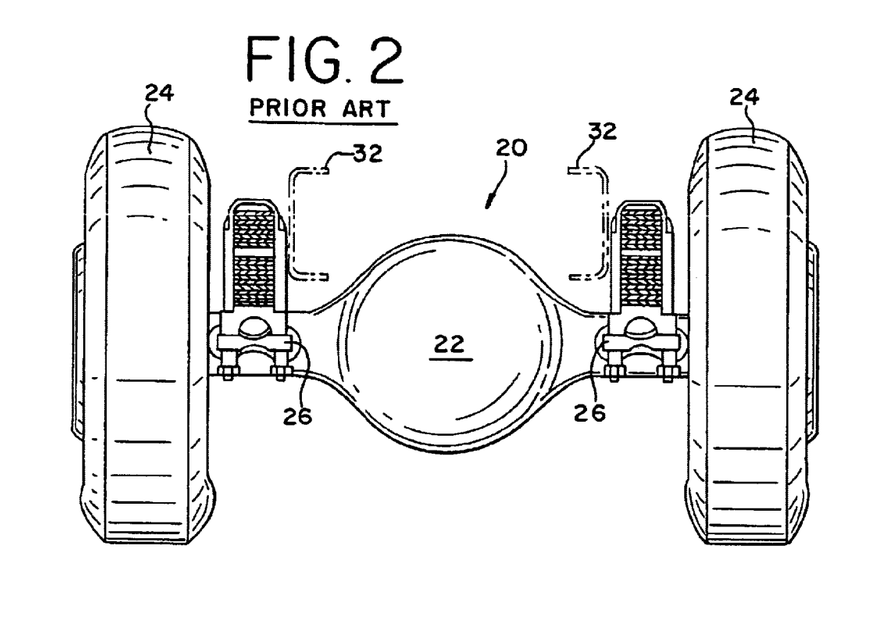
FIG. 2 is a rear view of the leaf spring attachment arrangement of FIG. 1.

The auxiliary leaf spring pack 36 is seated on, and separated from the main leaf spring pack 34 by, a spacer 48. The leaf springs that form the auxiliary leaf spring pack 36 are bundled together by ties 50. Under normal circumstances, the auxiliary leaf spring pack 36 is inactive. However, if the vehicle is heavily loaded, the opposite ends of the auxiliary leaf spring pack 36 will engage against brackets 52, which are fixedly mounted to frame 32. This, in turn, will cause auxiliary leaf spring pack 36 to deflect during heavy vehicle load conditions.

Several components, a few of which have already been identified, hold the main and auxiliary leaf spring packs together. Those components also connect the leaf spring packs to the axle housing 20. In this arrangement, the threaded ends of two U-bolts 54 are inserted through bores extending through a guide plate 56, which is positioned atop the auxiliary leaf spring pack 36. The U-bolt ends are also inserted through bores extending through the axle seating 46 and bores extending through each of the axle connection devices 26. Nuts 58 are then tightened to the threaded ends of U-bolts 54 to tighten the entire assembly.

Figure 3:
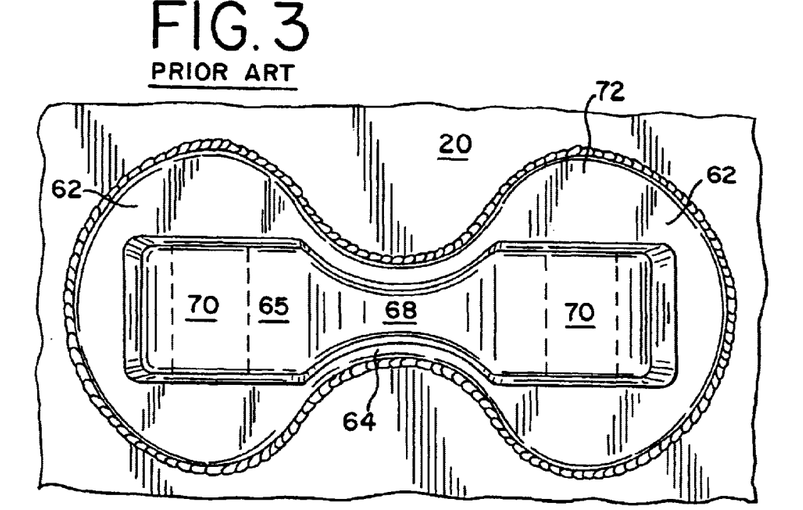
FIG. 3 is a front view of the axle connection device used in FIG. 1.
Figure 4:
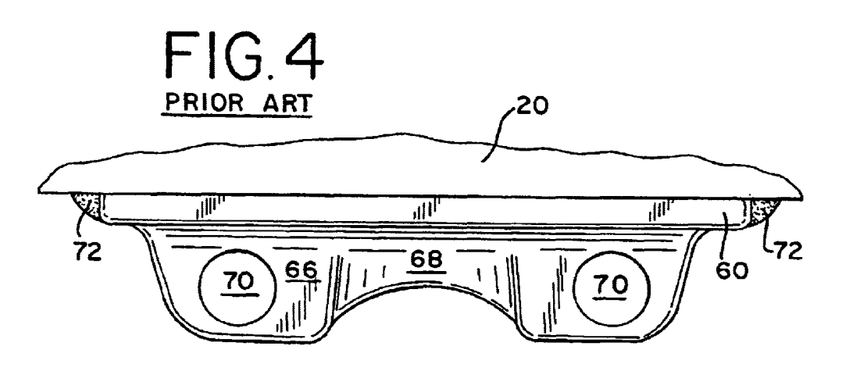
FIG. 4 is a top view of the axle connection device used in FIG. 1.
Figure 5:
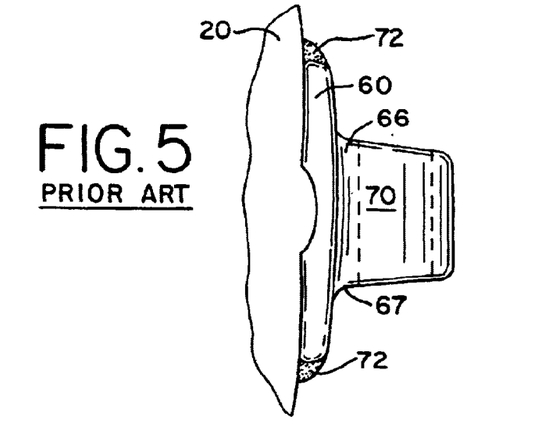
FIG. 5 is a side view of the axle connection device used in FIG. 1.

FIGS. 3–5 illustrate the axle connection devices 26 shown and described in U.S. Pat. No. 4,227,716. As shown, these devices include a baseplate 60 having circular ends 62 and a relatively short and narrow waist 64 dividing the ends. As such, the shape of baseplate 60 is similar to the symbol used to identify the mathematical concept of infinity. This shape permits the welds that connect the baseplate to the axle housing to withstand the forces exerted upon it during torsion of the axle housing.

A horizontal plane 65 projects outwardly from baseplate 60. Horizontal plane 65 includes a relatively flat and horizontally projecting upper surface 66 and a relatively flat and horizontally projecting lower surface 67. Upper surface 66 is generally parallel with lower surface 67. Horizontal plane 65 also includes a waist 68 correspondingly positioned with waist 64 of baseplate 60 to divide plane 65 into two portions, each having a bore 70 extending straight through it. Bores 70 accommodate the threaded ends of U-bolts 54 when the leaf spring packs 34, 36 are connected to the axle housing 20. Each axle connection device 26 is welded to the axle housing 20 by way of a continuous weld 72 formed along the edge of baseplate 60 and extending about its entire perimeter.

Although these axle connection devices have proven suitable for permitting connection of a vehicle suspension to an axle housing, they have had some drawbacks. As will be appreciated by those skilled in the art, each vehicle make and model typically has its own set of pinion angles for each of its axles. The set of pinion angles used for one vehicle is typically not the same used for another. Furthermore, the pinion angle used for one axle of a vehicle is typically not the same used for another axle of that vehicle. All of this considered, it will be appreciated by those skilled in the art that axle housings typically are not positioned so that they extend straight up and down. Rather, they are rotated to an extent to accommodate the required pinion angle.

In light of the construction of the aforementioned axle connection devices, it was often necessary to use additional parts and components to attach the vehicle suspension to the axle housing. These additional parts and components were required in order to accommodate the pinion angle. Such additional parts and components might, for instance, be uniquely designed shims or washers. Use of these additional parts and components added weight and expense to the suspension system, and required additional worker time and expense to design these components and to position, assemble and service them while the suspension system is connected to the axle housing.

As will also be appreciated by those skilled in the art, axle housings are ordinarily constructed in two halves that are fused or welded together. Often, the two axle housing halves have at least a slight mismatch, and use of the above-described axle connection devices required use of additional parts and components to accommodate this mismatch. Again, this added considerable weight and expense to the suspension system design, and required additional worker time and expense to design these components and to position, assemble and service them while the suspension system is connected to the axle housing.

Another drawback of these welded axle connection devices is that they were welded to the axle housing by a continuous weld run that traversed about the entire perimeter of the device. Use of this much metal added significant weight to the vehicle and amounted to additional expense. In practice, it has been typically necessary to use a continuous triple pass weld about the entire perimeter of the device to hold it to the axle housing. This even further added to the weight of the vehicle and amounted to even further additional expense.

In light of the foregoing, it is desirable to reduce the weight of vehicles that include welded axle connection devices.

It is also desirable to reduce the expense associated with such vehicles.

It is further desirable to eliminate the necessity of including additional components in such vehicles.

It is yet further desirable to design a welded axle connection device that has built-in features to accommodate varying pinion angles.

It is still further desirable to design a welded axle connection device that has built-in features to accommodate axle housing mismatch.

It is also desirable to design a welded axle connection device and devise a method for welding the device to an axle housing so that substantially less metal is used during the welding process.

These and other objects of the preferred form of the invention will become apparent from the following description. It will be understood, however, that an apparatus or method could still appropriate the invention claimed herein without accomplishing each and every one of these objects, including those gleaned from the following description. The appended claims, not the objects, define the subject matter of this invention. Any and all objects are derived from the preferred form of the invention, not necessarily the invention in general.

SUMMARY OF THE INVENTION

The present invention is directed to an axle connection device that is designed to be welded to an axle housing to permit a vehicle suspension system to be connected to the axle housing. The axle connection device includes a generally flat baseplate having curvilinear ends separated by a relatively long and narrow waist. Each end includes a curvilinear side rim and two rounded corners from which the rim of the baseplate smoothly tapers towards the waist. The device also includes a generally horizontally projecting plane having a waist aligned with the waist of the baseplate to divide the plane into two distinct portions. The plane also has two supporting sidewalls. Both sidewalls extend from just inside the rounded corners of a respective end of the baseplate and taper towards associated corners of the horizontally projecting plane. Each portion of the plane includes a generally rounded boss extending from the plane. A slot extending from the intersection of the baseplate and the plane is incorporated in each boss to allow a connection bolt to pass through the device. The construction of the device permits it to accommodate varying pinion angles and axle housing mismatch.

The present invention is also directed to a method of welding an axle connection device to a face of an axle housing. The method includes forming two continuous welds along both longitudinal edges of the device. Each weld begins longitudinally inward of one of the rounded corners of the device, preferably one of the rounded corners positioned closest to the spindle end of the axle. The weld is formed such that it extends longitudinally outwardly towards that rounded corner to a weld end, which is positioned longitudinally inward of that corner. The weld is then turned back on itself and extends longitudinally inwardly along the tapering slope of the end of the device towards the waist portion thereof to form a double-pass weld at its end. The weld then extends through the waist portion, then longitudinally outwardly along the tapering slope of the opposite end of the device to a point just shy of the rounded corner at that end. At that point, the weld is again turned back on itself to form a double-pass weld at its end. The weld is then terminated. Another continuous weld is made in like fashion along the opposing longitudinal edge of the device. Under this method, substantially less weld is used and the weld lines do not traverse over, along and/or around the rounded corners of the device. As a result, the axle housing (as opposed to the weld runs) primarily absorbs any torsional loading.

BRIEF DESCRIPTION OF THE DRAWINGS

In the following detailed description, reference will frequently be made to the following drawing, in which like reference numerals refer to like components, and in which.

DETAILED DESCRIPTION OF THE PREFERRED EMBODIMENTS

Figures 6, 7, 8, 9:
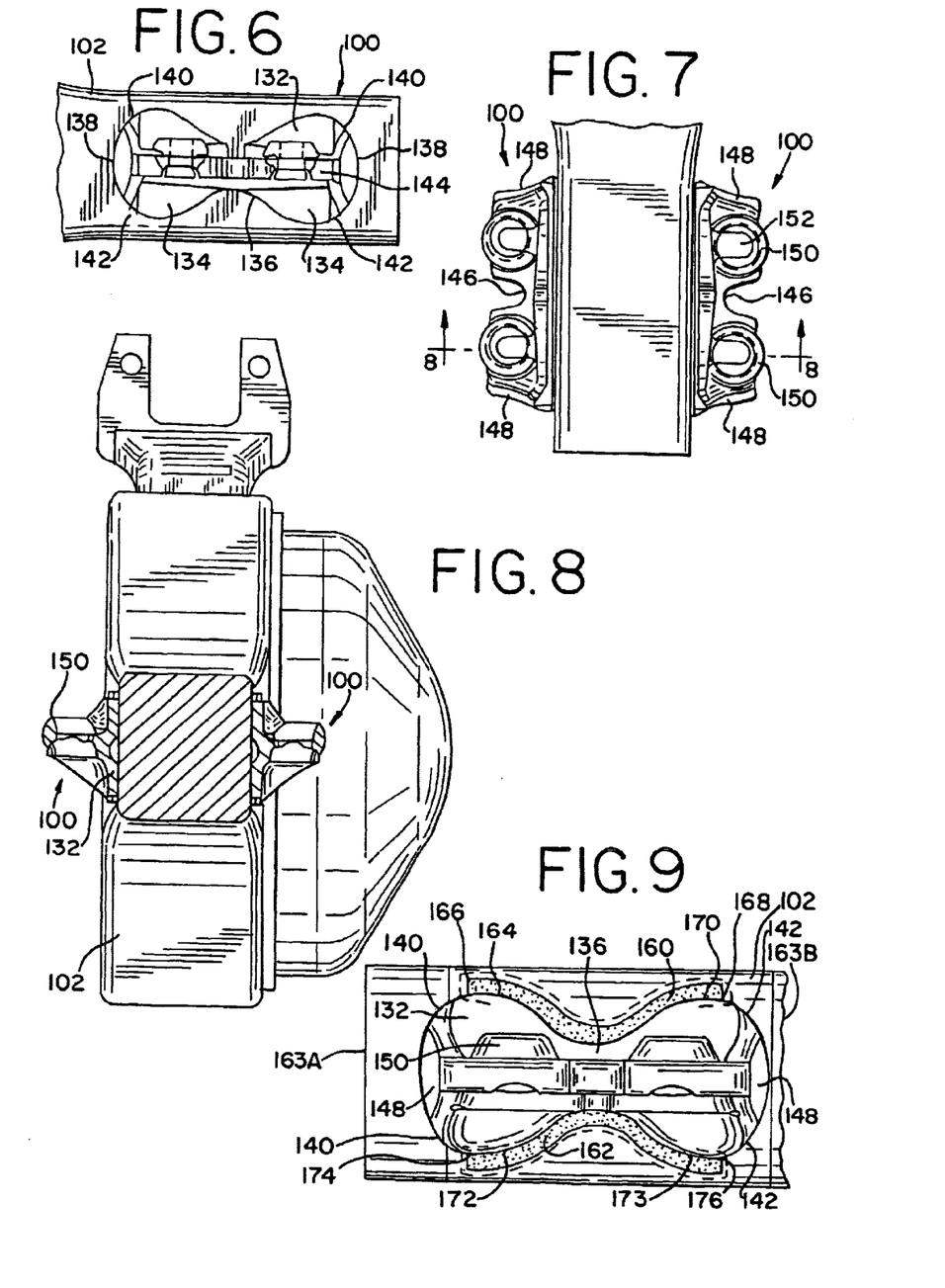
FIG. 6 is a front view of the axle connection device of the present invention, shown attached to a face of an axle housing.
FIG. 7 is a top view of two axle connection devices of the present invention, shown attached to opposite faces of an axle housing.
FIG. 8 is a sectional view of the axle connection device of the present invention, taken along line 8—8 of FIG. 7.
FIG. 9 is a diagrammatic view of the axle connection device showing the detail of the welding process of the present invention.

Referring to FIGS. 6–8, an axle connection device 100 is shown. Axle connection device 100 is similar to axle connection device 26, described above, to the extent that it permits the connection of a vehicle suspension system to an axle housing. In that regard, axle connection device 100 could replace the axle connection devices 26 and be mounted to opposite faces of axle housing 20 shown in FIG. 1. So mounted, it would permit vehicle suspension 30 to be connected to axle housing 20.

Figure 10:
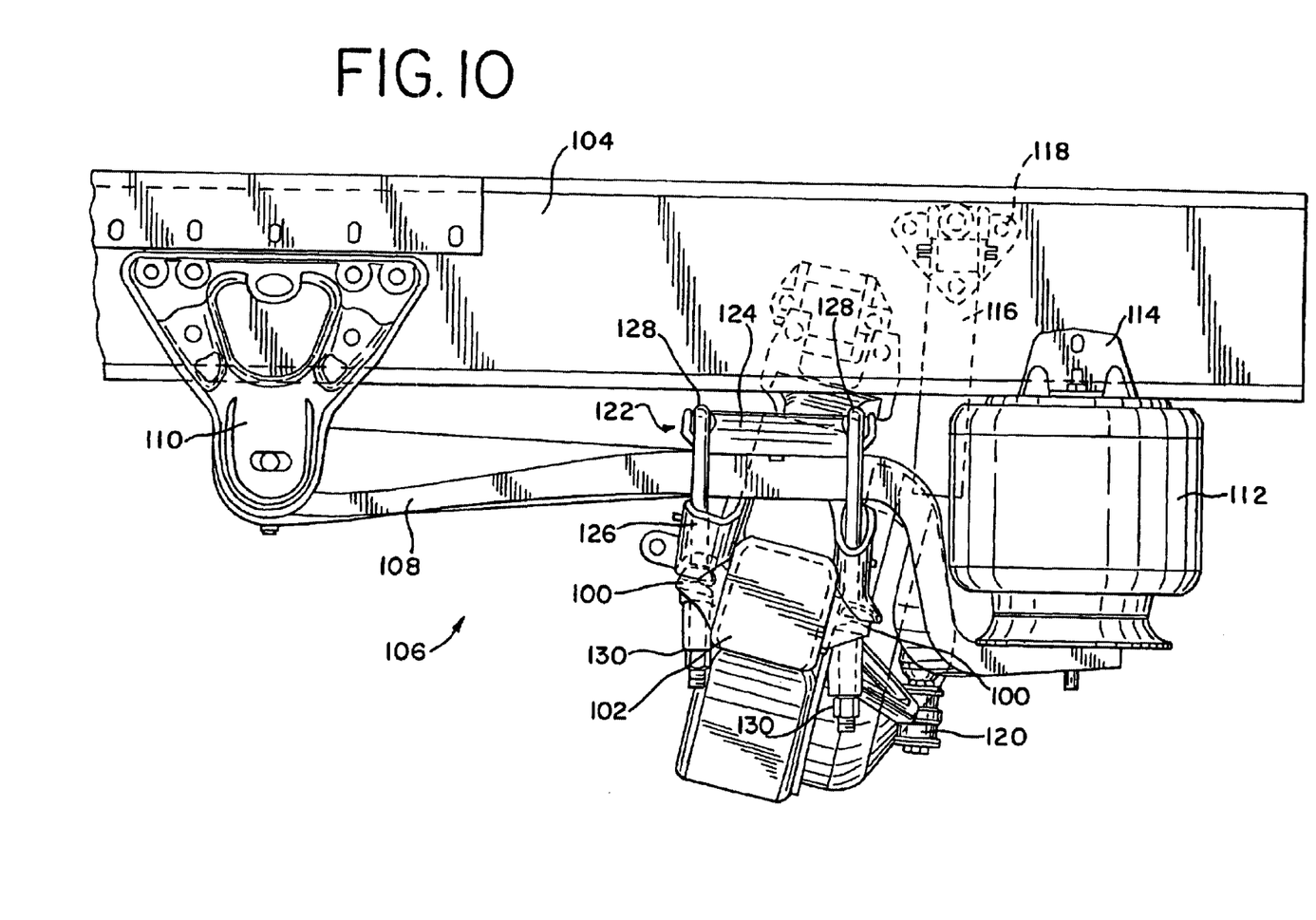
FIG. 10 is a side view of a suspension system utilizing the axle connection device of the present invention to attach active components of the suspension system to the axle housing

Referring now briefly to FIG. 10, two axle connection devices 100 are shown as being mounted to the front and rear faces of an axle housing 102. FIG. 10 further illustrates a longitudinally extending vehicle frame 104 that is sprung above a vehicle axle by a vehicle suspension 106. The vehicle suspension 106 shown in FIG. 10 is generally referred to as a trailing arm suspension by those skilled in the art. In suspension system 106, one end of a Z-shaped spring 108 is pivotally connected to a hanger 110, which, in turn, is mounted to vehicle frame 104. The opposite end of Z-shaped spring 108 is connected to an air spring 112, which is connected to the vehicle frame 104 through a mounting bracket 114.

One end of a shock 116 is attached to a mounting bracket 118, which is mounted to vehicle frame 104. The other end of shock 116 is received within a port included in a shock mounting device 120, which is attached to the axle housing 102 by an axle attachment assembly 122.

Axle attachment assembly 122 includes a guide plate 124, an axle seat 126, two U-bolts bolts 128, fasteners 130, and two axle connection devices 100 constructed in accordance with the principles of the present invention. Much as described above with reference to FIG. 1, the U-bolts 128 connect the active components of vehicle suspension 106 with the axle housing 102. As shown, however, the axle housing 102 is shown as being rotated slightly in FIG. 10 to accommodate the pinion angle. Under these circumstances, use of axle connection device 100, which has built-in features to accommodate the pinion angle, provides substantial benefits beyond those derived from the axle connection devices 26 illustrated in FIGS. 1–5.

Referring back to FIGS. 6–8, as shown, the axle connection device 100 is designed to be welded to opposing faces of the axle housing 102. The axle connection device 100 includes a generally flat baseplate 132 having curvilinear ends 134 separated by a relatively long and narrow waist 136. In this configuration, axle connection device 100 resembles a dog bone-like shape. Each end 134 includes a curvilinear side rim 138 and two rounded corners 140, 142 from which the rim of the baseplate smoothly tapers towards waist 136.

The axle connection device 100 also includes a horizontally projecting plane 144 having a waist 146 correspondingly positioned with the waist 136 of baseplate 132. Waist 146 divides plane 144 into two distinct portions. Plane 144 includes two supporting sidewalls 148. Sidewalls 148 extend from just laterally inward of the rounded corners 140, 142 of a respective end of the baseplate 132 and taper towards the corresponding corners of horizontally projecting plane 144.

Each portion of plane 144 includes a generally rounded boss 150 extending from the plane. A slot 152 extending from the intersection of baseplate 132 and plane 144 is indexed with and incorporated in each boss 150 to allow a connection bolt, such as the aforementioned U-bolts 128, to pass through the axle connection device 100. The geometry and construction of axle connection device 100, and particularly its bosses 150, permit the device to accommodate varying pinion angles and axle housing mismatch.

Referring now to FIG. 9, two continuous weld runs 160, 162 are used to weld axle connection device 100 to axle housing 102. As shown, axle connection device 100 is connected to axle housing 102 such that one base end portion is closer to the spindle end 163A of the axle housing while the other base end portion is closer to the bowl end 163B of the axle housing. Weld runs 160, 162 preferably extend over opposite longitudinal edges of the rim of baseplate 132. Unlike the continuous weld run shown in FIG. 3, weld runs 160, 162 do not traverse about the entire perimeter of baseplate 132. This reduction of metal is a result of the unique weld technique described below and the geometry and construction of axle connection device 100.

As shown, weld 160 is preferably formed by beginning the welding process at a point longitudinally inwardly of one of the rounded corners positioned at the top longitudinal edge of device 100. It will be understood, however, that the first weld run could be along the bottom longitudinal edge of device 100.

Preferably, weld 160 begins closest to rounded corner 140, as that corner is closest to the spindle end 163A of the axle housing 102. From its beginning point 164, weld 160 is formed such that it extends longitudinally outwardly towards rounded corner 140 to a weld end 166, which is positioned longitudinally inward of corner 140. Weld 160 is then turned back onto itself and extends down the tapering slope of device 100 towards waist 136 to form a double-pass weld between beginning point 164 and weld end 166.

Weld 160 then extends through waist 136, upward along the tapering slope of the opposite end of device 100, and longitudinally outward towards rounded corner 142. Just shy of rounded corner 142, weld 160 is again turned back on itself at weld end 168 and continues to a weld termination point 170. As a result, weld 160 forms another double-pass weld between weld end 168 and termination point 170.

Weld 162 is formed in a similar fashion along the bottom longitudinal edge of device 100. In particular, weld 162 preferably begins closest to rounded corner 140, as that corner is closest to the spindle end 163A of the axle housing 102. From its beginning point 172, weld 162 is formed such that it extends longitudinally outwardly towards rounded corner 140 to a weld end 174, which is positioned longitudinally inward of corner 140. Weld 162 is then turned back onto itself and extends down the tapering slope of device 100 towards waist 136 to form a double-pass weld between beginning point 172 and weld end 174.

Weld 162 then extends through waist 136, upward along the tapering slope of the opposite end of device 100, and longitudinally outward towards rounded corner 142. Just shy of rounded corner 142, weld 162 is again turned back on itself at weld end 176 and continues to a weld termination point 178. As a result, weld 162 forms another double-pass weld between weld end 176 and termination point 178.

As a result of this unique method, less metal is used. Furthermore, in light of the geometry and construction of device 100 and weld runs 160, 162, the axle housing 102 primarily absorbs any torsional loading. As a result, the extent to which the weld runs 160, 162 are subjected to torsional loading is minimized, thereby reducing the possibility of cracking.

While this invention has been described with reference to an illustrative embodiment, it will be understood that this description shall not be construed in a limiting sense. Rather, various changes and modifications can be made to the illustrative embodiment without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

What is claimed is:

1. An axle connection device adapted to be connected to an axle housing to permit a vehicle suspension system to be connected to the axle housing, comprising:
   a base having first and second base end portions separated by a centrally positioned base central portion;
   a portion of the device extending generally normally and projecting from said base, said portion of the device having a central portion and first and second end portions separated thereby and positioned at opposite sides thereof;
   a first rounded boss extending from said first end portion of said portion of the device having a slot extending through it to accommodate varying pinion angles; and
   a second rounded boss extending from said second end portion of said portion of the device having a slot extending through it to accommodate varying pinion angles.

2. The axle connection device as defined by claim 1 wherein said first base end portion includes a first laterally extending side rim, first and second longitudinally extending edges, and first and second rounded corners positioned between and adjoining said first side rim with said first and second edges, and wherein said second base end portion includes a second laterally extending side rim, third and fourth longitudinally extending edges, and third and fourth rounded corners positioned between and adjoining said second side rim with said third and fourth edges.

3. The axle connection device as defined by claim 1 wherein said base central portion comprises a base waist portion having a lateral thickness less than a lateral thickness of said first base end portion and less than a lateral thickness of said second base end portion, and said longitudinal edges taper smoothly from respective ones of said rounded corners to said base waist portion.

4. The axle connection device as defined by claim 3 wherein said base waist portion is relatively long and narrow, giving said device a configuration resembling that of a dogbone.

5. The axle connection device as defined by claim 3 wherein said central portion of said portion of the device comprises a waist portion of said portion of the device aligned with said base waist portion.

6. The axle connection device as defined by claim 1 wherein said base comprises a generally flat baseplate.

7. The axle connection device as defined by claim 1 further comprising a first sidewall extending from said first base end portion and a second sidewall extending from said second base end portion.

8. A method of welding an axle connection device to an axle housing, said axle connection device having a base that includes first and second base end portions separated by a base waist portion, said first base end portion including a first laterally extending side rim, first and second longitudinally extending edges positioned on opposite sides of said device and first and second corners positioned between and adjoining said first side rim with said first and second longitudinally extending edges, and said second base end portion including a second laterally extending side rim, third and fourth longitudinally extending edges positioned on opposite sides of said device and third and fourth corners positioned between and adjoining said second side rim with said third and fourth longitudinally extending edges, said method comprising the steps of:

beginning a first weld run at a first weld run beginning point positioned along said first longitudinally extending edge of said first base end portion;
   continuing said first weld run along said first longitudinally extending edge towards said first corner to a first weld run first end point positioned longitudinally inward of said first corner;
   turning said first weld run back onto itself at said first weld run first end point and extending it along said first longitudinally extending edge to said first weld run beginning point to form a first double-pass weld portion for said first weld run;
   continuing said first weld run along said first longitudinally extending edge from said first weld run beginning point, along said base waist portion and along said third longitudinally extending edge of the second base end portion to a first weld run second end point positioned longitudinally inward of said third corner;
   turning said first weld run back onto itself at said first weld run second end point and extending it along said third longitudinally extending edge to a first weld run termination point positioned along said third longitudinally extending edge to form a second double-pass weld portion for said first weld run;
   beginning a second weld run at a second weld run beginning point positioned along one of said second and fourth longitudinally extending edges;
   continuing said second weld run along said one of said second and fourth longitudinally extending edges towards one of said second and fourth corners to a second weld run first end point positioned longitudinally inward of said one of said second and fourth corners;
   turning said second weld run back onto itself at said second weld run first end point and extending it along said one of said second and fourth longitudinally extending edges to said second weld run beginning point to form a first double-pass weld portion for said second weld run;
   continuing said second weld run along said one of said second and fourth longitudinally extending edges from said second weld run beginning point, along said base waist portion and along another of said second and fourth longitudinally extending edges to a second weld run second end point positioned longitudinally inward of another of said second and fourth corners; and
   turning said second weld run back onto itself at said second weld run second end point and extending it along said another of said second and fourth longitudinally extending edges to a second weld run termination point positioned along said another of said second and fourth longitudinally extending edges to form a second double-pass weld portion for said second weld run.

9. The method as defined by claim 8 wherein said one of said second and fourth longitudinally extending edges is said second longitudinally extending edge, said another of said second and fourth longitudinally extending edges is said fourth longitudinally extending edge, said one of said second and fourth corners is said second corner, and said another of said second and fourth corners is said fourth corner.

10. The method as defined by claim 8 wherein said axle housing includes a spindle end and a bowl end and wherein said axle connection device is welded to said axle housing such that said first base end is closer to said spindle end than said second base end and said second base end is closer to said bowl end than said first base end.

11. The method as defined by claim 8 wherein said first and third longitudinally extending edges are positioned along an upper longitudinal edge of said axle connection device and said second and fourth longitudinally extending edges are positioned along a lower longitudinal edge of said axle connection device.

12. The method as defined by claim 8 wherein said first weld run comprises a continuous weld run and said second weld run comprises a continuous weld run.

13. An axle connection device welded to an axle housing to permit a vehicle suspension system to be connected to the axle housing, comprising:
   a base having first and second base end portions separated by a centrally positioned base central portion;
   said first base end portion including a first laterally extending side rim, first and second longitudinally extending edges positioned on opposite sides of said device and first and second corners positioned between and adjoining said first side rim with said first and second edges;
   said second base end portion including a second laterally extending side rim, third and fourth longitudinally extending edges positioned on opposite sides of said device and third and fourth corners positioned between and adjoining said second side rim with said third and fourth edges;
   a plane projecting from said base, said plane having a plane central portion and first and second plane end portions separated thereby and positioned at opposite sides thereof;
   said first plane end portion having a first opening extending through it;
   said second plane end portion having a second opening through it;
   a first weld run extending along portions of said first and third longitudinally extending edges between a first weld run first end point positioned along said first longitudinally extending edge longitudinally inward of said first corner and a first weld run second end point positioned along said third longitudinally extending edge longitudinally inward of said third corner; and
   a second weld run extending between a second weld run first end point positioned along said second longitudinally extending edge longitudinally inward of said second corner and a second weld run second end point positioned along said fourth longitudinally extending edge longitudinally inward of said fourth corner.

14. The axle connection device as defined by claim 13 wherein said first weld run includes a first double-pass weld portion and said second weld run includes a second double-pass weld portion.

15. An axle connection device adapted to be connected to an axle housing to permit a vehicle suspension system to be connected to the axle housing, comprising:
   a base having first and second base end portions separated by a centrally positioned base central portion;
   a portion of the device extending generally normally and projecting from said base, said portion of the device having a central portion and first and second end portions separated thereby and positioned at opposite sides thereof;
   a first rounded boss extending from said first end portion of said portion of the device having a slot extending through it to accommodate axle mismatch; and
   a second rounded boss extending from said second end portion of said portion of the device having a slot extending through it to accommodate axle mismatch.

16. The axle connection device as defined by claim 15 wherein said first base end portion includes a first laterally extending side rim, first and second longitudinally extending edges, and first and second rounded corners positioned between and adjoining said first side rim with said first and second edges, and wherein said second base end portion includes a second laterally extending side rim, third and fourth longitudinally extending edges, and third and fourth rounded corners positioned between and adjoining said second side rim with said third and fourth edges.

17. The axle connection device as defined by claim 15 wherein said base central portion comprises a base waist portion having a lateral thickness less than a lateral thickness of said first base end portion and less than a lateral thickness of said second base end portion, and said longitudinal edges taper smoothly from respective ones of said rounded corners to said base waist portion.

18. The axle connection device as defined by claim 17 wherein said base waist portion is relatively long and narrow, giving said device a configuration resembling that of a dogbone.

19. The axle connection device as defined by claim 17 wherein said central portion of said portion of the device comprises a waist portion of said portion of the device aligned with said base waist portion.

20. The axle connection device as defined by claim 15 wherein said base comprises a generally flat baseplate.

21. The axle connection device as defined by claim 15 further comprising a first sidewall extending from said first base end portion and a second sidewall extending from said second base end portion.

22. An axle connection device adapted to be connected to an axle housing to permit a vehicle suspension system to be connected to the axle housing, comprising:
   a base having first and second base end portions separated by a centrally positioned base central portion;
   a portion of the device extending generally normally and projecting from said base, said portion of the device having a central portion and first and second end portions separated thereby and positioned at opposite sides thereof;
   a first rounded boss extending from said first end portion of said portion of the device having a slot extending through it to accommodate varying pinion angles and axle mismatch; and
   second rounded boss extending from said second end portion of said portion of the device having a slot extending through it to accommodate varying pinion angles and axle mismatch.

23. The axle connection device as defined by claim 22 wherein said first base end portion includes a first laterally extending side rim, first and second longitudinally extending edges, and first and second rounded corners positioned between and adjoining said first side rim with said first and second edges, and wherein said second base end portion includes a second laterally extending side rim, third and fourth longitudinally extending edges, and third and fourth rounded corners positioned between and adjoining said second side rim with said third and fourth edges.

24. The axle connection device as defined by claim 22 wherein said base central portion comprises a base waist portion having a lateral thickness less than a lateral thickness of said first base end portion and less than a lateral thickness of said second base end portion, and said longitudinal edges taper smoothly from respective ones of said rounded corners to said base waist portion.

25. The axle connection device as defined by claim 22 wherein said base waist portion is relatively long and narrow, giving said device a configuration resembling that of a dogbone.

26. The axle connection device as defined by claim 24 wherein said central portion of said portion of the device comprises a waist portion of said portion of the device aligned with said base waist portion.

27. The axle connection device as defined by claim 22 wherein said base comprises a generally flat baseplate.

28. The axle connection device as defined by claim 22 further comprising a first sidewall extending from said first base end portion and a second sidewall extending from said second base end portion.

* * * * *